US009032098B2

(12) United States Patent
Van De Poel

(10) Patent No.: US 9,032,098 B2
(45) Date of Patent: May 12, 2015

(54) DEVICE AND METHOD FOR RETRIEVING INFORMATION FROM A DEVICE

(75) Inventor: Dirk Van De Poel, Edegem (BE)

(73) Assignee: Thomson Licensing (FR)

( * ) Notice: Subject to any disclaimer, the term of this patent is extended or adjusted under 35 U.S.C. 154(b) by 203 days.

(21) Appl. No.: 12/998,112

(22) PCT Filed: Sep. 17, 2009

(86) PCT No.: PCT/EP2009/062065
§ 371 (c)(1),
(2), (4) Date: Mar. 18, 2011

(87) PCT Pub. No.: WO2010/031817
PCT Pub. Date: Mar. 25, 2010

(65) Prior Publication Data
US 2011/0173348 A1    Jul. 14, 2011

(30) Foreign Application Priority Data
Sep. 18, 2008    (EP) .................................... 08447042

(51) Int. Cl.
*G06F 15/16*    (2006.01)
*H04L 12/46*    (2006.01)
(Continued)

(52) U.S. Cl.
CPC ............ *H04L 12/4625* (2013.01); *H04L 12/66* (2013.01); *H04L 41/0253* (2013.01); *H04L 41/0853* (2013.01); *H04L 67/2814* (2013.01); *H04L 41/0213* (2013.01)

(58) Field of Classification Search
CPC . H04L 12/4625; H04L 12/66; H04L 67/2814; H04L 41/0253; H04L 41/0853; H04L 41/0213; H04N 7/173; H04N 17/004; H04N 21/6582; H04N 21/6125; H04N 21/44227

USPC .................................................. 709/249, 224
See application file for complete search history.

(56) References Cited

U.S. PATENT DOCUMENTS 6,636,894 B1 * 10/2003 Short et al. .................... 709/225
6,834,298 B1    12/2004 Singer et al.
(Continued)

FOREIGN PATENT DOCUMENTS

CN        1946087        4/2007
CN        101242336      8/2008
(Continued)

OTHER PUBLICATIONS

"TR-069 CPE WAN Management Protocol v1.1 Issue 1 Amendment 2", Broadband Forum Technical Report, No. 1, Amendment 2, Dec. 1, 2007, pp. 1-138.
(Continued)

*Primary Examiner* — Wing F Chan
*Assistant Examiner* — Padma Mundur
(74) *Attorney, Agent, or Firm* — Jack Schwartz & Associates, PLLC

(57) ABSTRACT

The present invention concerns a gateway, and a method at a gateway for retrieving information from a device without requiring any configuration and installation at the device. To this end the invention relates to a method in a gateway device comprising an interface to a first network, an interface to a second network and a local web server. The method comprises the steps intercepting a request from a first device detected on the first network to a web server located on the second network, sending a webpage located on the local web server to the device, the webpage comprising means for, when the webpage is loaded by the device, retrieving information from that device and receiving information from the device, the information being retrieved from said device by the webpage.

10 Claims, 2 Drawing Sheets

(51) Int. Cl.
*H04L 12/66* (2006.01)
*H04L 12/24* (2006.01)
*H04L 29/08* (2006.01)

(56) References Cited

U.S. PATENT DOCUMENTS

| | | | |
|---|---|---|---|
| 7,219,124 B2* | 5/2007 | Cerami et al. | 709/203 |
| 8,171,494 B2* | 5/2012 | Champagne et al. | 719/313 |
| 8,325,739 B2 | 12/2012 | Van De Poel et al. | |
| 2005/0273832 A1* | 12/2005 | Zigmond et al. | 725/112 |
| 2006/0015590 A1 | 1/2006 | Patil et al. | |
| 2008/0228911 A1* | 9/2008 | Mackey | 709/224 |
| 2009/0064255 A1* | 3/2009 | Jiang et al. | 725/118 |

FOREIGN PATENT DOCUMENTS

| | | |
|---|---|---|
| JP | 2007122228 | 5/2007 |
| JP | 2008538883 | 11/2008 |
| WO | WO0152071 | 7/2001 |
| WO | WO2006020758 | 2/2006 |
| WO | WO2006/114367 | 11/2006 |

OTHER PUBLICATIONS

Search Report Dated Mar. 4, 2010.
Duan et al. "Networked System Manageffient: Topology Discovery and Host Monitoring and Control", http://www.cs.berkeley.edu/~duan/prjs/cs252/echo.html, Mar. 14, 2008, pp. 1-10.
Wikipedia, "Simple Network Management Protocol", http://en.wikipedia.org/wiki/Simple_Network_Management_Protocol, Mar. 14, 2008, pp. 1-10.
"IISGuard", http://www.iistools.com/en/iisguard.html, Mar. 14, 2008, pp. 1-3.
"IntelliJ IDEA", http://www.java2s,com/Code/JavaScript/Windo-Browser/GetBrowserversion. html, Mar. 14, 2008, pp. 1-2.
"IIS Log File Formate (IIS 6.0)", http://www.microsoft.com/technet/prodtechnol/WindowsServer2003/Library/IIS/be22e074-72da-bb, Mar. 14, 2008, p. 1.
Park et al. "Java-Based Network Management Environment", Communications, 1998, ICC 98. Conference Record,1998 IEEE International Conference on, vol. 2, Jun. 7-11, 1998 pp. 1124-.1128.

* cited by examiner

DEVICE AND METHOD FOR RETRIEVING INFORMATION FROM A DEVICE

This application claims the benefit, under 35 U.S.C. §365 of International Application PCT/EP2009/062065, filed Sep. 17, 2009, which was published in accordance with PCT Article 21(2) on Mar. 25, 2010 in English and which claims the benefit of European patent application No. 08447042.6, filed Sep. 18, 2008.

FIELD OF THE INVENTION

The present invention relates generally to a Internet gateway device and to local network devices behind the gateway, and in particular to methods for simplifying remote control of such devices.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

A network router usually functions as a gateway connecting a local area network to the Internet. It is configured with the proper settings including an either dynamic or fixed public IP address. It performs Network Address Translation (NAT), defined in the IETF RFC 3022, between the local network private IP addresses and the public Internet IP address. In addition it contains a local network IP address and typically contains a DHCP server function to dynamically assign IP addresses to all devices on the local network.

The gateway is usually managed by a Management Server located on the network via a management protocol such as DSL Forum TR-069 or the Simple Network Management Protocol (SNMP). The TR-069 is specified in "DSL Forum Technical Report, TR-069 Amendment 1, CPE WAN Management Protocol, dated November 2006". SNMP is specified in the IETF RFC 1157. The Management Server is managed and controlled by an Internet service provider.

To reduce the number of helpdesk calls and overall installation and service problems, the service providers typically rely upon diagnostics and troubleshooting tools. These tools aim at providing relevant diagnostics information and possibly performing active troubleshooting tests, such as device and service availability tests. The gateway then plays an important and central role in providing local network diagnostics and troubleshooting capabilities under control of a management server. The gateway collects information about the home network devices based upon passive collection of device information such as hardware and IP address, status and connection time. In particular, it can get information from the gateway DHCP server lease table.

The monitoring and diagnostics at the service provider consists in the collection of relevant local network device information. In particular, information on hardware and IP addresses, operating system and web browser used enables a helpdesk to support a customer. It helps to diagnose any home networking problem such as lack of Internet access.

To be able to retrieve information from home network devices, existing solutions rely upon local network device installation of software programs. These software programs usually run on a computer or on device operating system. They collect relevant device information. They optionally use this information for pro-active troubleshooting. They optionally communicate this information to the service provider. An example of such a solution is the Network Magic software (Registered Trademark) from Pure Networks. It permits to discover the home network and provide a local based overview of the home network.

Relying upon such software programs is not user friendly and may pose problems. It requires installing a software program on each device of the local network. Each Operating System needs a compatible program to be created and supported by the devices on the local network. The tool is dependent on software; whenever installation of the software fails, there is no information available at the service provider.

SUMMARY OF THE INVENTION

The present invention attempts to remedy at least some of the concerns connected with information retrieving in the prior art, by providing a method to automatically retrieving information from a local device.

The invention concerns a method at a gateway for retrieving information from a device without requiring any configuration and installation at the device.

It applies notably to the field of local home networks, but also more generally to other fields where a device can intercept traffic between two devices.

To this end, the invention relates to a method in a gateway device comprising an interface to a first network, an interface to a second network and a local web server, the method comprising the steps of intercepting a request from a first device detected on the first network to a web server located on the second network, sending a webpage located on the local web server (14) to the device, the webpage comprising means for, when the webpage is loaded by the device, retrieving information from that device, and receiving information from the device, the information being retrieved from said device by said webpage.

The method enables the gateway to retrieve information from the device. This doesn't require installing any software in the device. And this doesn't require any skill for the end user.

According to an embodiment of the invention, after the step of intercepting, and prior to the step of sending, the method comprises the steps of redirecting the first device to the webpage located on the local web server and receiving a request from the first device to the webpage According to an embodiment of the invention, the webpage comprises code that, when executed on said device, is adapted to get information of that device, and send said information to the gateway.

According to an embodiment of the invention, the webpage comprises JavaScript code that is adapted to read information from a Navigator Object of the device, and send information of the Navigator object to the gateway.

According to an embodiment of the invention, after detecting the first device on the first network, the gateway intercepts all the requests received from said first device.

In order quickly to get information, the requests from the device are automatically intercepted.

According to an embodiment of the invention, the method comprises the step of redirecting the first device to the device located on the second network, after having retrieved information from said device.

According to an embodiment of the invention, the local webpage comprises information that is adapted to show on the device user interface that a temporary management process is on going.

According to an embodiment of the invention, the information is made available to a management server located on the second network, either upon request of the management server or via an automatic notification to the management server.

Another object of the invention is a gateway device adapted to intercept information from a device. The device comprises an interface to a first network and an interface to a second network, detector for detecting a device on the first network, a local web server to store webpages, information retrieving means for, on reception of a request to a web server located on the second network, sending a web page located on the local web server to the detected device, the webpage comprising means for, when the webpage is loaded by the device, retrieving information from that device.

Another object of the invention is a computer program product comprising program code instructions for executing the steps of the method according to the invention, when that program is executed on a computer. By "computer program product", it is meant a computer program support, which may consist not only in a storing space containing the program, such as a diskette or a cassette, but also in a signal, such as an electrical or optical signal.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which:

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

Figure 1:
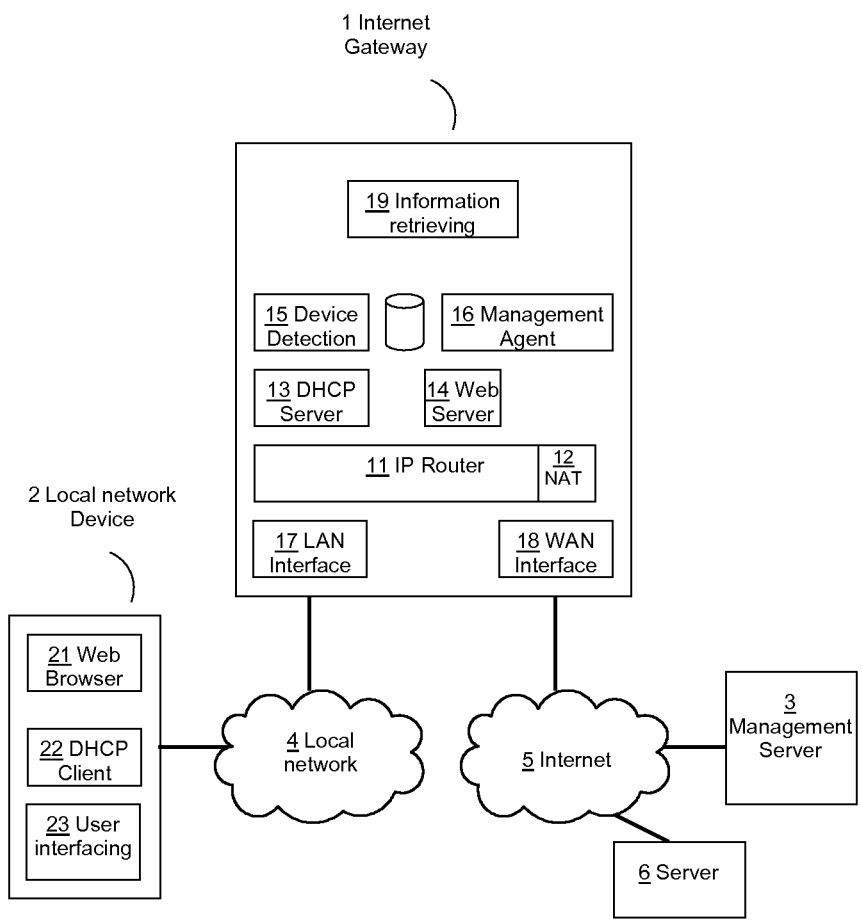
FIG. 1 is a block diagram of a system with an object compliant with the embodiment.

The system according to the embodiment is illustrated in FIG. 1. A gateway 1 comprises a LAN interface 17 for connecting to a first network that is a local area network LAN 4. The local area network may be of any LAN technology well known to the skilled in the art. It may be any wired technology such as the Ethernet, or any wireless technology such as Wi-Fi. The gateway comprises a WAN interface 18 for connecting to a second network that is an Internet network 5.

The Internet gateway comprises a device detection module 15. It is adapted to detect any new device connected to the LAN 4. It is also adapted to collect information about all devices connected to the home network. Information may include hardware address or MAC address, IP address, addressing type (static or dynamic), gateway local network interface connected to, current status, connectivity time. The gateway comprises a DHCP server 13 that assigns dynamic IP addresses to all DHCP client devices connected to the local network. It comprises an information retrieval module that is adapted to get information from devices detected on the LAN. It comprises a web server module 14 that is adapted to serve local GUI webpages. The web server generally receives HTTP request from web clients, namely web browsers, and sends HTTP responses with data content, or web pages, such as HTML documents and linked objects. According to the embodiment, it provides special information retrieval pages that enable the information retrieval module to get information from the LAN devices. It comprises a management agent module 16 adapted to communicate with the management server 3. It performs management action such as providing information, applying configuration changes. It comprises an IP router 11 adapted to forward traffic between the local area network and the Internet. It comprises a NAT module 12 for performing address translation.

Of course the gateway device could be any type of device such as a broadband router, a wireless router or a DSL modem with router or any network device with IP router functionality. More generally the gateway could be any device comprising interfacing means and routing means.

The local network comprises a local device 2. Of course it could comprise more that one local device. The local device 2 comprises among others a DHCP client module 22 adapted to requesting a dynamic IP address from a DHCP server on the local network. It also comprises an HTTP web browser 21. It also comprises a user interface 23.

The management server 3 is adapted to communicate with the gateway management agent 16, under the control of a service provider, through the Internet connection. It is integrated into the service provider management systems, the service provider diagnostics and troubleshooting systems and its helpdesk.

Figure 2:
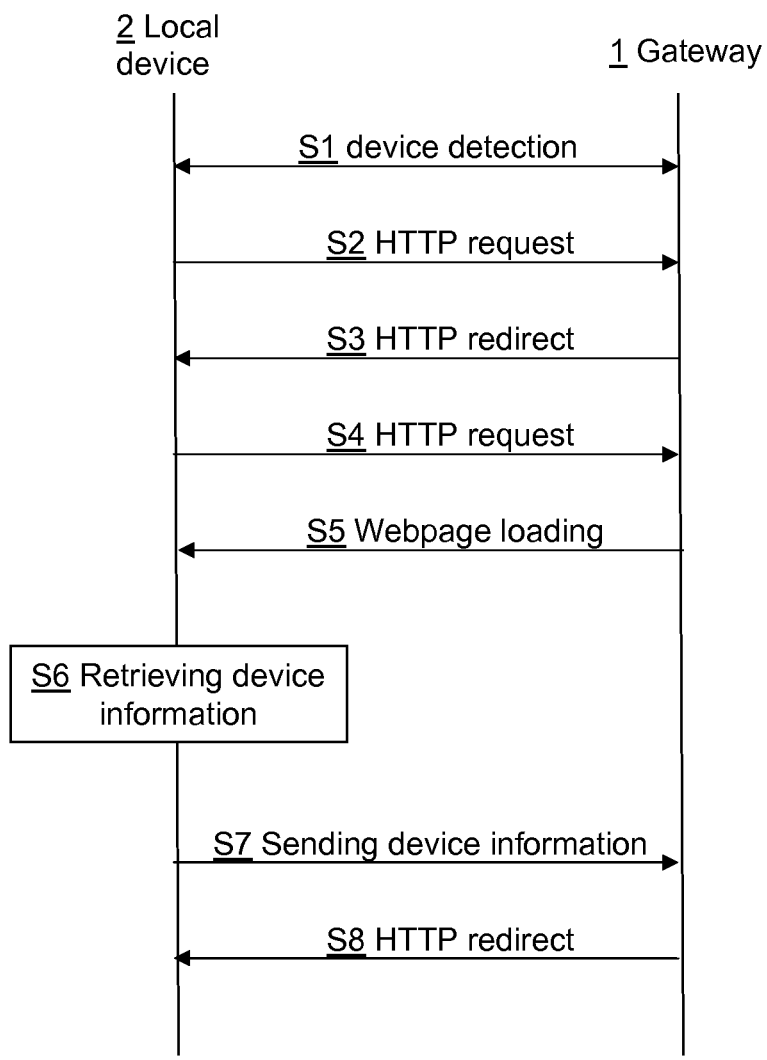
FIG. 2 is a flow chart of a method according to the embodiment.

The method for getting information from the devices on the local network is now described, and partly illustrated in FIG. 2. The information retrieving module of the gateway gets all information from the local devices as follows. When a new device is connected to the local network, it sends a DHCP request on the local network. On reception of the DHCP request, the gateway DHCP server assigns a dynamic IP address to the device. The device detecting module detects the presence of the new device on the LAN step S1. At this step, an information retrieving module 19 of the gateway gets information on the local device, such as its IP and hardware addresses using Address Resolution Protocol (ARP) as defined in IETF RFC 826. It also retrieves the DHCP device vendor values, and the device UPnP capabilities via UPnP advertisements. The detected local device is then indicated in the gateway GUI, with the retrieved information. The information retrieving module enters that device information, such as hardware address, IP address, DHCP options, lease time, in its local device discovery database.

After having caught all that information, the information retrieving module of the gateway still needs to retrieve information for this device. It sets up a rule in the router to route any HTTP request from that device to the gateway itself, and in particular to the gateway web server. The rule changes the destination address of incoming traffic from that device on TCP port 80 (HTTP) to the gateway IP address.

Here, the gateway sets up the rule just after detecting the device. It could also set up the rule later, for example on request from a management server.

Later, the local device sends an HTTP request on the TCP port number 80 of the requested website. The local device web browser is opened by a user to request a website, e.g. www.example.net.

The router receives the request, step S2, and routes the request to the gateway web server. The web server redirects the local device web browser to a particular webpage on the gateway web server, step S3, namely to a temporary uniform resource identifier URI. The information retrieving module has also previously configured the HTTP server embedded in the gateway to redirect the web browser using the Temporary Redirect Status code 307 as indicated in HTTP 1.1 (RFC2616).

On reception of the HTTP redirect, the HTTP client automatically issues a new HTTP request to the Internet Gateway to that particular webpage, step S4.

On reception of the HTTP request on that particular webpage, the device web browser loads the particular webpage, step S5, which contains JavaScript code that will be executed by the device web browser. JavaScript is a programming language which is interpreted and executed by the device web browser. JavaScript comprises a program to read the Navigator object information; it is made available by the web browser as part of standard JavaScript and DOM (Document Object Model) support. The Navigator object is automatically created by the JavaScript runtime engine. The Navigator object is a JavaScript object that comprises among others the browser name, the browser version and language, the operating system platform, the device CPU information, the selected browser and the system language. When read, it is stored in JavaScript variables within the browser, step S6. Another piece of the JavaScript code/program instructs the browser to send a HTTP message (e.g. POST) to a web server (here the gateway web server), e.g. containing information in a specific format (e.g. XML).

The Navigator object itself is not sent to the server. JavaScript reads information within the Navigator object in the web browser and then instructs the web browser to send the information to the gateway web server, step S7.

The gateway web server passes this information to the gateway device discovery component database.

Once the information has been retrieved by the HTTP server, the information retrieving module is informed, and modifies the router rule to no longer intercept incoming HTTP from that device.

The particular webpage contains a generic text or message to the user, such as "Please bookmark this page to configure gateway settings and services". This enables the user to understand why the page is shown instead of the initially requested base.

Either automatically after a short period of time or by the user pressing a button to continue, the page is redirected to the originally requested page (e.g. www.example.net), step S8.

The gateway exposes the information added to its local device discovery database via the management agent to the service provider management server.

Whenever a problem arises (either pro-actively detected or the user calls the service provider helpdesk to report a problem), the service provider has this relevant information available to perform a diagnostics analysis without needing to request the end-user to verbally communicate this information (when calling the helpdesk).

In a variant embodiment, the device is not redirected to the gateway web server. The intercepted request is sent to the gateway web server. The NAT router changes the destination IP of the request address to 127.0.0.1, which is the address of the local host or the gateway itself. It keeps the destination port (TCP port 80) which is the one the gateway web/HTTP server listens for requests.

When the web server identifies a request not destined for itself, ie for one of its web/HTML pages, it responds with the HTML page containing the information collection and processing javascript code. In FIG. 2, the HTTP request is received at step 2, and the gateway sends a HTTP response with the HTML webpage at step S5. This variant embodiment skips the steps of redirecting, S3 and S4.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:

1. Method of operating a gateway device to provide information about a first network device attached to a first network connected to a first interface of the gateway device, to a management server attached to a second network connected to a second network interface of the gateway device, said gateway device comprising a local web server, said method comprising, at the gateway device:

detecting the presence of the first network device on the first network;

retrieving a first set of information about the first network device and storing the retrieved information in a local database;

setting up, after retrieving said first set of information, a rule in the gateway device to route any request from the first network device to the local web server, so that said rule changes the destination address of incoming traffic from the first network device;

receiving a first request packet from said first network device located on the first network destined to a third network device attached to the second network;

redirecting, in response to said first request packet, said first network device to a webpage located on the local web server of said gateway device;

receiving a second request packet from said first device to provide said webpage to which it was redirected;

providing said requested webpage located on said local web server to said first network device, said webpage including instructions to cause the first network device to collect information about said first network device to perform a diagnostics analysis on any network problem, when said webpage is loaded by said first network device, and to send the collected information to the gateway device;

receiving said collected information sent by said first network device;

modifying the rule to no longer intercept incoming traffic from the first network device, when the collected information has been received; and forwarding said collected information to the management server, either upon request of the management server or via an automatic notification from the gateway device to the management server.

2. Method according to claim 1, wherein said webpage located on said local web server of the gateway device comprises JavaScript code that is adapted to read information from a Navigator Object of said first network device and send information of the Navigator object to the gateway device.

3. Method according to claim 1, wherein after detecting the first network device on the first network, the gateway device intercepts all the request packets received from said first network device.

4. Method according to claim 1, wherein it comprises redirecting said first network device to the third network device attached to the second network, after having retrieved information from said first network device.

5. Method according to claim 1, wherein said webpage comprises information that is adapted to inform a user interface of the first network device, that a temporary management process is on going.

6. Method according to claim 1, said method being triggered after having detected the presence of the first network device on the first network.

7. Gateway device comprising:
one or more integrated circuits;
an interface to a first network and an interface to a second network;
a local web server to store at least a webpage;
a detector for detecting a first network device on the first network;
instructions to execute an information retrieving module for:
setting up, after retrieving a first set of information, a rule in the gateway device to route any request from the first network device to the local web server, so that said rule changes the destination address of incoming traffic from the first network device;
upon reception of a first request packet from said first network device to a remote web server attached to said second network, redirecting said first network device to a webpage located on the local web server;
upon reception of a second request packet from said first network device to said webpage, said webpage to said first network device, sending said webpage including instructions to cause the first network device to collect information about said first network device to perform a diagnostics analysis on any network problem when said webpage is loaded by said first network device, and to send the collected information to the gateway device;
modifying the rule to no longer intercept incoming traffic from the first network device, when the collected information has been received; and
a management agent for making said collected information about said first network device available to a management server located on said second network.

8. Gateway device according to claim 7, wherein said webpage located on said local web server of the gateway device comprises JavaScript code that is adapted to read information from a Navigator Object of said first network device and send information of the Navigator object to the gateway device.

9. Gateway device according to claim 7, wherein after detecting the first network device on the first network, the gateway device intercepts, through said interface to the first network, all the request packets received from said first network device.

10. Gateway device according to claim 7, wherein said webpage comprises information that is adapted to inform a user interface of the first network device, that a temporary management process is ongoing.

* * * * *